United States Patent [19]

Fosco et al.

[11] Patent Number: 4,507,623
[45] Date of Patent: Mar. 26, 1985

[54] OSCILLATING DEVICE WITH CAPACITIVE DISPLACEMENT PICKUP

[75] Inventors: Guido Fosco, Spreitenbach; Karl Schmutz, Zurich, both of Switzerland

[73] Assignee: Siemens-Albis AG, Zurich, Switzerland

[21] Appl. No.: 441,073

[22] Filed: Nov. 12, 1982

[30] Foreign Application Priority Data

Nov. 20, 1981 [CH] Switzerland ............... 7446/81

[51] Int. Cl.³ ............................ H03B 5/30
[52] U.S. Cl. ........................ 331/154; 310/36; 318/128; 368/158
[58] Field of Search ............ 331/116 M, 154, 156, 331/157; 310/15, 36, 25, 26, 27; 318/127, 128, 130; 368/157, 158, 160, 161, 162, 163, 166, 167

[56] References Cited

U.S. PATENT DOCUMENTS

| | | | |
|---|---|---|---|
| 2,106,058 | 1/1938 | Nielsen et al. | 310/68 E |
| 3,040,223 | 6/1962 | Buhrendorf | 318/124 |
| 3,123,728 | 3/1964 | Kreiskorte | 310/19 |
| 3,290,595 | 12/1966 | Novotny | 331/154 X |
| 3,346,792 | 10/1967 | Noumi | 318/138 |
| 3,517,288 | 6/1970 | Bennett et al. | 310/25 X |
| 3,652,955 | 3/1972 | Cruger et al. | 331/154 X |
| 3,784,888 | 1/1974 | Geiersbach et al. | 318/138 |
| 3,919,606 | 11/1975 | Nemoto | 318/128 |

FOREIGN PATENT DOCUMENTS 1591317  4/1970  France .
723418  2/1955  United Kingdom .

Primary Examiner—Eugene R. Laroche
Assistant Examiner—Robert J. Pascal
Attorney, Agent, or Firm—Werner W. Kleeman

[57] ABSTRACT

An oscillating device has an electro-mechanical drive, a pivotal or oscillating armature and a regulating circuit, wherein a capacitor, the capacitance of which varies with oscillation of the armature is used as a displacement transducer or pickup. A signal generated by a signal generator is conducted by way of the series-connection of the displacement transducer, a rectifier and a filter to an amplifier circuit, the frequency of said signal being much greater than the natural resonant frequency of oscillation of the electro-mechanical drive. An output voltage which is substantially in phase with the angular movements of the armature i.e. angle-proportional thereto, appears at the output of the amplifier circuit and is supplied to a set value input of a differential amplifier contained in the regulating circuit.

11 Claims, 5 Drawing Figures

OSCILLATING DEVICE WITH CAPACITIVE DISPLACEMENT PICKUP

BACKGROUND OF THE INVENTION

The present invention relates to a new and improved construction of an oscillating device.

In Swiss Pat. No. 596,701 there is described an electro-mechanical oscillating device comprising an oscillating member and a spring, which has a resonant frequency of oscillation. A regulating circuit controlled by means of an inductive displacement transducer or pickup provides a forcing signal which ensures that so much electric energy is supplied to the excitation windings of two electromagnets as is lost mechanically. For this purpose the control circuit is provided with a differential element including a proportional amplifier connected thereafter, as well as with a symmetry comparator including an integrator connected thereafter. Though this oscillating device is very suitable for applications where a relatively large angular displacement is required, it is not suitable for applications where it is important for the frequency of oscillation and phase angle of the forcing signal to be as accurate as possible.

SUMMARY OF THE INVENTION

It is therefore a primary object of the present invention to provide an improved construction of oscillating device which is caused to oscillate at a frequency substantially equal to the resonant frequency.

Another important object of the present invention aims at the provision of a new and improved construction of an oscillating device, by means of which there can be obtained great accuracy of the resonant frequency and the angle-proportional output voltage.

Accordingly, the invention provides an oscillating device which comprises:

an oscillatable member which has a resonant frequency of oscillation;

a drive means for supplying the oscillatable member with make-up energy to maintain its amplitude of oscillation at a constant value;

an electronic regulating unit for monitoring oscillation of the oscillatable member and for operating the drive means; and a variable position sensing capacitor, the capacitance of which varies in accordance with the angular position of the oscillatable member and which is supplied, in use, with a sensing signal from the regulating unit, the frequency of which is much higher than the resonant frequency.

The regulating unit may include:

a signal generator for supplying the sensing signal;

a first rectifier and a first filter which are serially connected to the input of an amplifier circuit which effects a phase displacement compensation;

a full-wave sound rectifier connected to one signal input of an operational amplifier and a second filter connected to the input of a variable-gain amplifier, the control terminal of which is connected to the output of the operational amplifier and the output of which is connected to the drive means; the output of the amplifier circuit being connected to the full-wave second rectifier and the second filter.

The position sensing capacitor may have two plates, one of which is connected to the signal generator and the other is connected to the first rectifier.

The regulating unit may also have a power amplifier connected between the variable-gain amplifier and the drive means.

Preferably, the position sensing capacitor includes at least one printed circuit which has a conductive zone, a tab fast with the oscillatable member being pivotally located adjacent to and in parallel with this conductive zone. The position sensing capacitor may be screened, as may be electric supply lines to the position sensing capacitor.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE DRAWINGS

Figure 1:
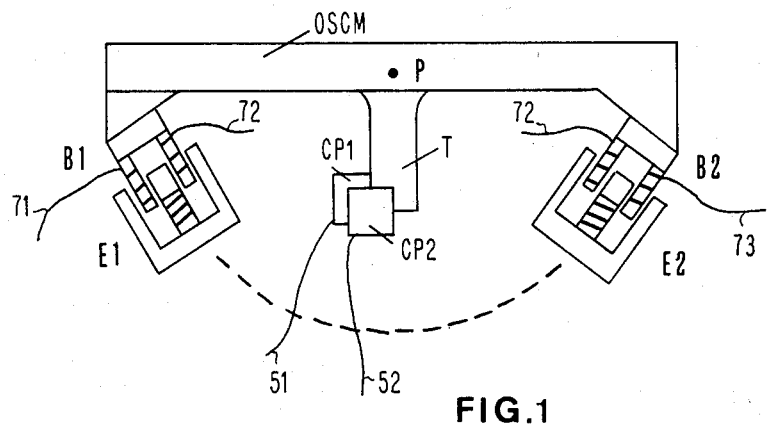
FIG. 1 shows an oscillating device including a tab pivotally arranged between two capacitor plates.

Describing now the drawings, an oscillating device according to FIG. 1 comprises a pivoted or oscillating armature OSCM, defining an oscillatable member in the form of a plate which is pivotal about a pivot axis P and is provided with a thin tab T and with two excitation coils B1 and B2 which, upon oscillation enter without touching and coaxially into the air gaps of magnetic circuits E1 and E2, respectively. The excitation coils B1 and B2 in conjunction with the magnetic circuits E1 and E2, respectively, constitute drive means for supplying the oscillatable member, here the oscillating armature OSCM, with make-up energy in order to maintain its amplitude of oscillation at a substantially constant value. The axes of symmetry of the excitation coils B1 and B2 are disposed in this case in a plane which is perpendicular to the pivotal axis P and coincides with the plane of symmetry of the tab T which is pivotally arranged between two capacitor plates CP1, CP2 and essentially in parallelism to their flat sides. On the free outer side of the armature OSCM there may be arranged, for example, a radar antenna or aerial or the mirror for the infrared radiation of a heat picture or imaging apparatus, wherein the outer side of the armature OSCM itself may be a reflecting surface. The tab T may be of metallic or dielectric material.

Figure 2:
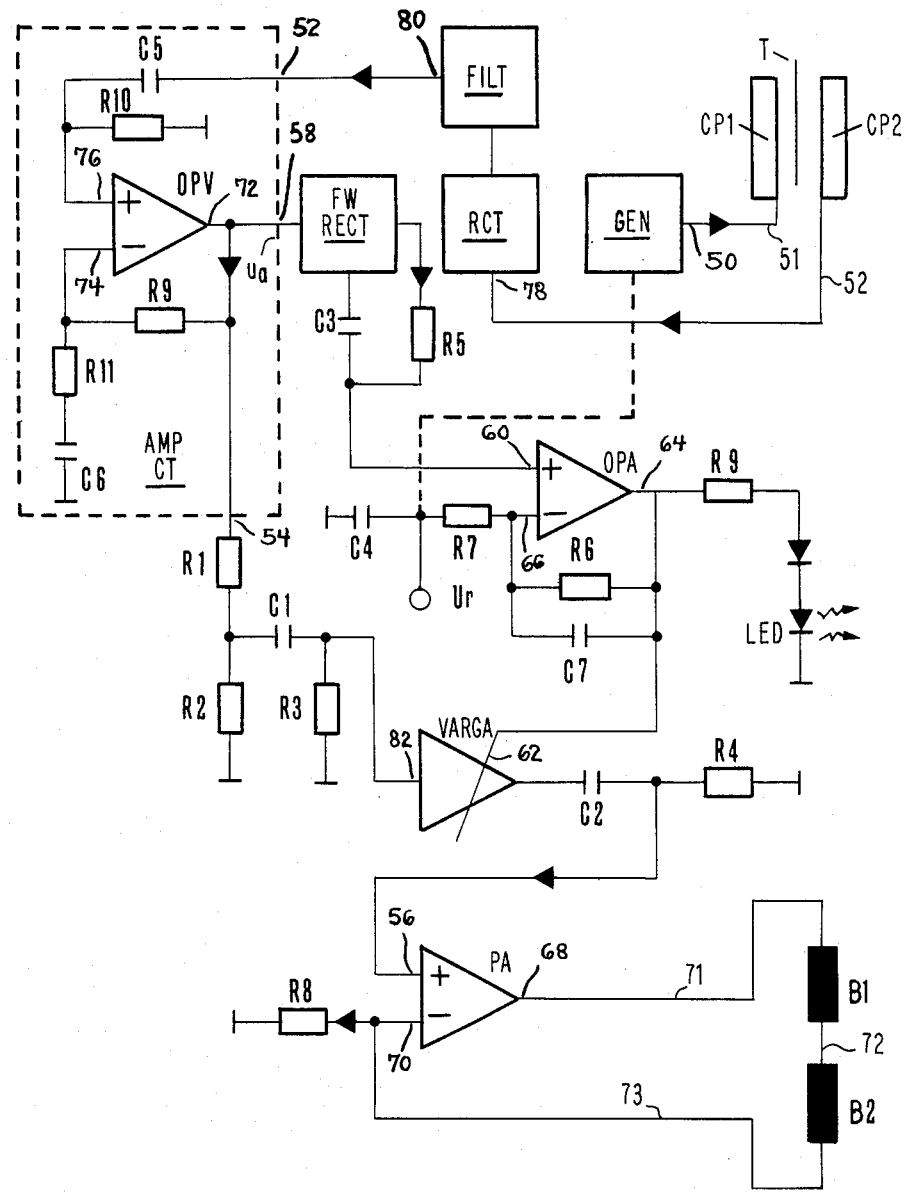
FIG. 2 shows a regulating circuit or unit for the oscillating device.

The regulating circuit according to FIG. 2 comprises a signal generator GEN, the output 50 of which is connected by means of a connecting line 51 to one of the two capacitor plates CP1 and CP2, here the capacitor plate CP1. The other capacitor plate CP2 is connected via connecting line 52 to a series-connection of a rectifier RCT and a filter FILT to the input 52 of an amplifier circuit AMP CT, the output 54 of which, in turn, is connected by way of a series-connection of a voltage divider R1, R2, to a first high-pass filter C1, R3, a variable-gain amplifier VARGA and a second high-pass filter C2, R3 to the non-inverting input 56 of a power amplifier PA. The output 58 of the amplifier circuit AMP CT is connected also via the series-connection of a full-wave rectifier FW RECT and a low-pass filter R5, C3 to the non-inverting input 60 of an operational amplifier OPA, the output signal of which is applied to the control input 62 of the variable-gain amplifier VARGA. A resistor R6 is interposed between the output 64 of the operational amplifier OPA and its inverting input 66 which is connected, in addition, by way of a resistor R7 first to a reference voltage source Ur and, secondly, by way of a capacitor C4 to a reference potential. Between the output 68 and the inverting input 70 of the power amplifier PA there is interposed the series-connection of the excitation coils B1 and B2 (FIG. 1). For this purpose, the output 68 is connected by a connecting line 71 to the excitation coil B1 which, in turn, is connected to the excitation coil B2 by means of an interconnecting line 72, and the excitation coil B2 is connected to the inverting input 70 of the power amplifier PA via a connecting line 73. This inverting input 70 is connected via a current-stabilizing resistor R8 to the reference potential. The output 64 of the operational amplifier OPA, finally, is connected by way of the series-connection of a resistor R9 and a light-emitting diode LED to the reference potential. The amplifier circuit AMP CT has an operational amplifier OPV, a resistor R9 being interposed between the output 72 of said operational amplifier and its inverting input 74, a high-pass filter C5, R10 being connected in series with the non-inverting input 76 of the operational amplifier OPV. The inverting input 74 of the operational amplifier OPV is connected via the series-connection of a resistor R11 and a capacitor C6 to the reference potential.

The regulating circuit or unit according to FIG. 2 functions as follows:

The signal generator GEN generates a sinusoidal signal, the frequency $f_o$ of which is much greater than the resonant frequency $f_r$ of the oscillatable armature or member OSCM. This sinusoidal signal arrives as a displacement current by way of the capacitor plates CP1 and CP2 at the input 78 of the rectifier RCT. Oscillation of the tab T results in a periodic variation of the capacitance of the capacitor formed by the capacitor plates CP1 and CP2, whereby an amplitude-modulated signal is presented to the input 78 of the rectifier RCT, which signal is rectified by the rectifier and appears as a demodulated signal of the frequency $f_r$ at the output 80 of the filter FILT.

The undesired phase rotation or shift of the signal caused by this demodulation, is compensated at least approximately bu the filters R10, C5 and C6, R11 of the amplifier circuit AMP CT which emits an amplified signal Ua which is substantially in phase i.e. possesses an exact proportionality to the angular movements of the oscillatable member OSCM. The full-wave rectifier FWRECT passes on negative input voltages non-invertedly and positive input voltages invertedly. Such a full-wave rectifier is described, for example, in U. Tietze and Ch. Schenk, *Halbleiter-Schaltungstechnik* Springer, 1978, page 656 et. seq. The operational amplifier OPA operates as a differential amplifier by comparing an actual value at its non-inverting input 60 with an adjustable set or reference value at its inverting input 66, wherein this actual value corresponds to the value of a voltage smoothed by the effect of the capacitor C3. In order to avoid instability, the amplifying factor or gain of this operational amplifier OPA can be reduced by the resistor R6 and/or capacitor C7 connected in parallel with the former.

The signal at the input 82 of the amplifier VARGA is a sinusoidal signal of the frequency $f_r$, without any D.C.-component, this signal being variably amplified in accordance with the output signal of the operational amplifier OPA. The high-pass filters C1, R3 and C2, R4 each effect a phase shift or rotation through 45°, whereby the driving current (which is amplified by the power amplifier PA) for the excitation coils B1 and B2 has a phase shift through 90° relative to the demodulated signal at the output 64 of the operational amplifier OPA. Thus, the excitation coils B1 and B2 are energized when the oscillatable armature or member SP is close to its center position.

The reference voltage Ur can suitably be proportional to the amplitude of the output signal of the signal generator GEN.

The oscillating device according to FIGS. 1 and 2 is advantageous in particular in regard to the capacitive displacement transducer or pickup, the capacitance of which is accurately determined for each angle.

Figure 3:
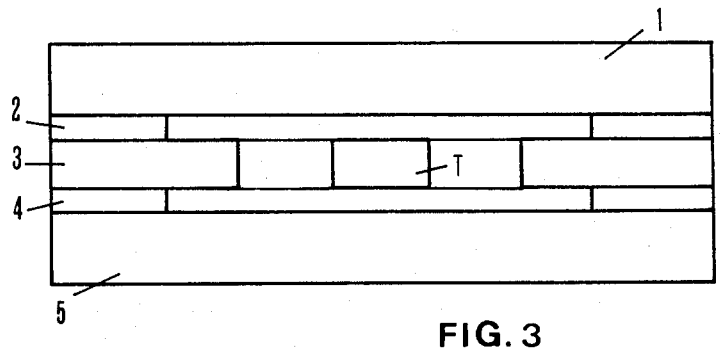
FIGS. 3 to 5 show the construction of the capacitor of the oscillating device.

FIG. 3 shows the construction of two capacitor plates 1 and 5 which may be used as the capacitor plates CP1 and CP2, respectively, and which are in the form of printed circuits and between which there is disposed the tab T and the screening plate 3, a spacer plate 2 and 4, respectively, being arranged at both sides of the former.

Figure 4:
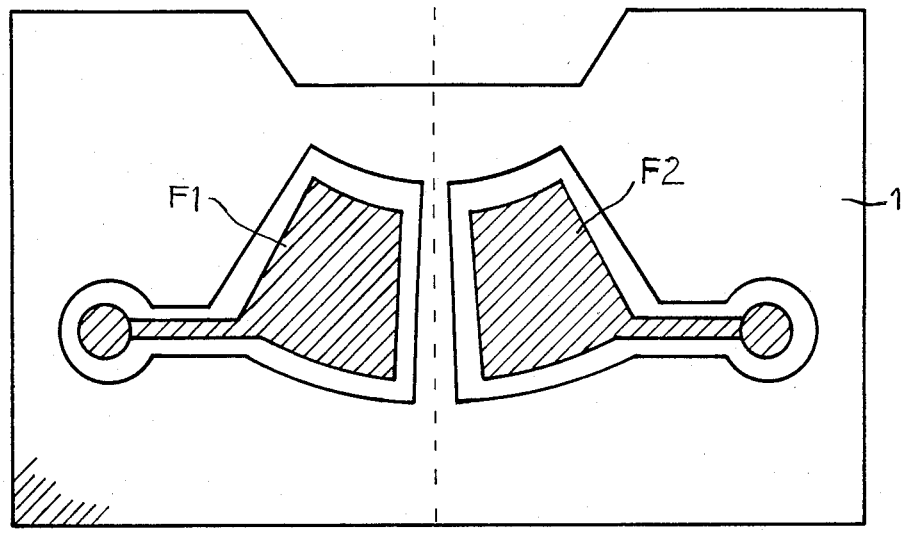

FIG. 4 shows one of the printed circuits 1 or 5 with two conductive zones F1, F2, which may be used for forming a capacitive full-wave displacement transducer. The regulating circuit according to FIG. 1 operates with only one active zone of a printed circuit at a time. For operating such a full-wave displacement transducer, by means of which the accuracy of the resonant frequency is improved, the regulating circuit may have an additional differential amplifier, of which the inverting input is connected to the one active zone F1 and of which the non-inverting input is connected to the other active zone F2 and which is connected to the same printed circuit, wherein the output signal of this differential amplifier is supplied to the input of the rectifier RCT or, possibly, to the input of a synchronous demodulator. The active zones of the other printed circuit can be connected jointly to the output of the signal generator GEN. Such synchronous demodulator can be synchronized, for example, via a Schmitt trigger with the output signal of the signal generator GEN.

Figure 5:
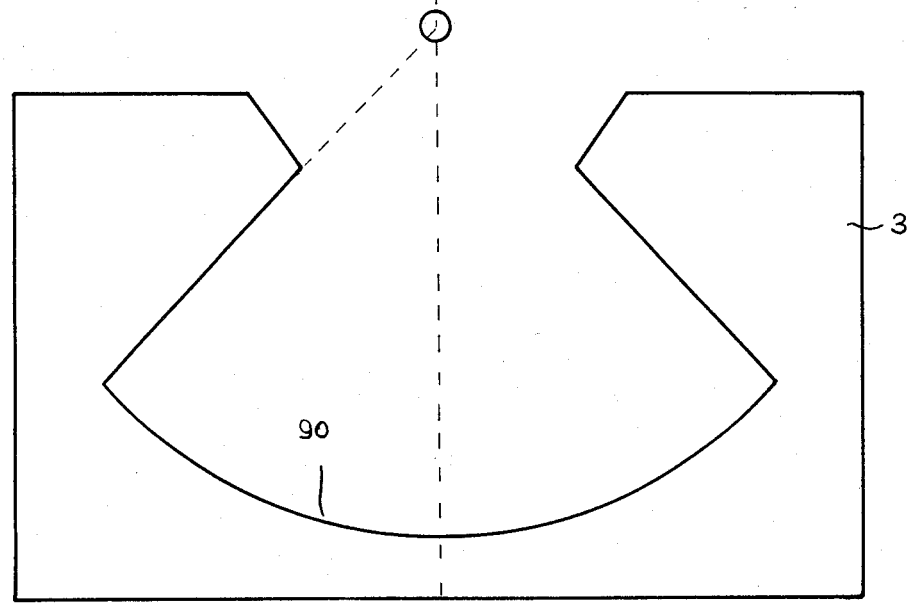

The screening plate illustrated in FIG. 5 has an arcuate recess 90 into which the tab T projects.

Both the displacement transducer and the full-wave displacement transducer can be considered as quasistatic angle transducers, wherein offset voltages which may be present, can easily be compensated.

While there are shown and described present preferred embodiments of the invention, it is to be distinctly understood that the invention is not limited thereto, but may be otherwise variously embodied and practiced within the scope of the following claims. Accordingly,

What we claim is:

1. An oscillating device comprising:
    an oscillatable member which has a resonant frequency of oscillation;
    a drive means for supplying the oscillatable member with make-up energy to maintain its amplitude of oscillation at a substantially constant value;
    an electronic regulating unit monitoring said amplitude of oscillation of the oscillatable member and being operatively connected to the drive means in order to maintain, in response to the monitoring of said amplitude of oscillation, said amplitude of oscillation of said oscillatable member at said substantially constant value; and said electronic regulating unit containing, for monitoring said amplitude of oscillation of said oscillatable member, a variable-position sensing capacitor, the capacitance of which varies in accordance with the angular position of the oscillatable member and which is supplied, in use, with a sensing signal from the regulating unit, the frequency of which is much higher than the resonant frequency.

2. An oscillating device comprising:

an oscillatable member which has a resonant frequency of oscillation;

a drive means for supplying the oscillatable member with make-up energy to maintain its amplitude of oscillation at a substantially constant value;

an electronic regulating unit monitoring said amplitude of oscillation of the oscillatable member and being operatively connected to said drive means in order to maintain, in response to the monitoring of said amplitude of oscillation, said amplitude of oscillation of said oscillatable member at said substantially constant value;

said electronic regulating unit containing, for monitoring said amplitude of oscillation of said oscillatable member, a variable-position sensing capacitor, the capacitance of which varies in accordance with the angular position of the oscillatable member and which is supplied, in use, with a sensing signal from the regulating unit, the frequency of which is much higher than the resonant frequency;

said regulating unit including:

a signal generator for supplying the sensing signal;

a first rectifier and a first filter which are serially connected to an input of an amplifier circuit which effects a phase displacement compensation;

a full-wave second rectifier connected to one signal input of an operational amplifier and a second filter connected to an input of a variable-gain amplifier, a control terminal of which is connected to an output of the operational amplifier and an output of which is connected to the drive means;

said amplifier circuit having an output means connected to the full-wave second rectifier and the second filter; and the position sensing capacitor has two plates, one of which is connected to the signal generator and the other is connected to the first rectifier.

3. The oscillating device according to claim 2, wherein:

the regulating unit has a power amplifier connected between the variable-gain amplifier and the drive means.

4. An oscillating device comprising:

an oscillatable member which has a resonant frequency of oscillation;

a drive means for supplying the oscillatable member with make-up energy to maintain its amplitude of oscillation at a substantially constant value;

an electronic regulating unit monitoring said amplitude of oscillation of the oscillatable member and being operatively connected to said drive means in order to maintain, in response to the monitoring of said amplitude of oscillation, said amplitude of oscillation of said oscillatable member at said substantially constant value;

said electronic regulating unit containing, for monitoring said amplitude of oscillation of said oscillatable member, a variable-position sensing capacitor, the capacitance of which varies in accordance with the angular position of the oscillatable member and which is supplied, in use, with a sensing signal from the regulating unit, the frequency of which is much higher than the resonant frequency;

the position sensing capacitor including at least one printed circuit which has a conductive zone; and a tab fast with the oscillatable member being pivotally located adjacent to and substantially in parallel with said conductive zone.

5. The oscillating device according to claim 1, wherein:

the position sensing capacitor is screened.

6. The oscillating device according to claim 5, wherein:

electric supply lines to the position sensing capacitor are screened.

7. An oscillating device comprising:

an oscillatable member which has a resonant frequency of oscillation;

a variable gain amplifier having an input, an output and a control terminal;

a drive means connected to the output of said variable-gain amplifier for supplying the oscillatable member with make-up energy to maintain its amplitude of oscillation at a substantially constant value;

a variable-position sensing capacitor, the capacitance of which varies in accordance with the angular position of the oscillatable member;

a signal generator supplying said sensing capacitor with a sensing signal of a frequency which is much higher than the resonant frequency;

a first rectifier and a first filter which are serially connected to an input of an amplifier circuit which effects a phase displacement compensation;

a full-wave second rectifier connected to one signal input of an operational amplifier and a second filter connected to the input of said variable-gain amplifier, the control terminal of which is connected to an output of the operational amplifier and the output of which variable gain amplifier is connected to the drive means;

said amplifier circuit having an output means connected to the full-wave second rectifier and the second filter; and the position sensing capacitor has two plates, one of which is connected to the signal generator and the other is connected to the first rectifier.

8. The oscillating device according to claim 7, further including:

a power amplifier connected between the variable-gain amplifier and the drive means.

9. The oscillating device according to claim 8, wherein:

the position sensing capacitor includes at least one printed circuit which has a conductive zone; and a tab fast with the oscillatable member being pivotally located adjacent to and substantially in parallel with said conductive zone.

10. The oscillating device according to claim 7, wherein:

the position sensing capacitor is screened.

11. The oscillating device according to claim 10, wherein:

electric supply lines to the position sensing capacitor are screened.

* * * * *

UNITED STATES PATENT AND TRADEMARK OFFICE
CERTIFICATE OF CORRECTION

PATENT NO. : 4,507,623
DATED : March 26, 1985
INVENTOR(S) : Guido Fosco et al

It is certified that error appears in the above—identified patent and that said Letters Patent is hereby corrected as shown below:

Column 3, line 47, after "approximately" please delete "bu" and insert --by--

Column 4, line 9, after "member" please delete "SP" and insert --OSCM--

Signed and Sealed this

Twenty-seventh Day of August 1985

[SEAL]

Attest:

DONALD J. QUIGG

Attesting Officer

Acting Commissioner of Patents and Trademarks